(12) United States Patent
Reed

(10) Patent No.: US 11,066,018 B1
(45) Date of Patent: Jul. 20, 2021

(54) CUSTOMIZABLE VEHICLE SIDE MIRROR TRIM

(71) Applicant: Derrick Dammond Reed, Brooklyn Park, MN (US)

(72) Inventor: Derrick Dammond Reed, Brooklyn Park, MN (US)

( * ) Notice: Subject to any disclaimer, the term of this patent is extended or adjusted under 35 U.S.C. 154(b) by 0 days.

(21) Appl. No.: 16/855,662

(22) Filed: Apr. 22, 2020

(51) Int. Cl.
*B60R 1/12* (2006.01)

(52) U.S. Cl.
CPC .................................. *B60R 1/1207* (2013.01)

(58) Field of Classification Search
CPC ........... B60R 1/1207; B60R 1/02; B60R 1/06; B60Q 1/2665; B60Q 5/0404
See application file for complete search history.

(56) References Cited

U.S. PATENT DOCUMENTS

| | | | | |
|---|---|---|---|---|
| 5,151,824 A | * | 9/1992 | O'Farrell | B60R 1/02 359/514 |
| 5,938,322 A | * | 8/1999 | Alonzo, Jr. | B60R 1/1207 362/494 |
| 6,000,823 A | * | 12/1999 | Desmond | B60Q 1/2665 362/135 |
| 8,210,724 B2 | * | 7/2012 | Ying | B60Q 3/66 362/479 |
| 8,827,517 B2 | * | 9/2014 | Cammenga | B60R 1/12 362/494 |
| 10,576,896 B2 | * | 3/2020 | Huizen | F21S 43/249 |
| 2018/0265005 A1 | * | 9/2018 | Lettis | B60R 1/072 |

\* cited by examiner

*Primary Examiner* — Peggy A Neils

(57) ABSTRACT

A customizable vehicle side mirror trim as provides a subtle yet distinctive trim accent to create a clean, custom appearance for any vehicle make or model, without covering the entire mirror housing. The customizable vehicle side mirror trim can be quickly installed to add a flash of color or a touch of polished texture to the user's side mirrors, for a strong, stylish look that will set the vehicle apart. The customizable vehicle side mirror trim easily clips onto the edge of the mirror housing and attaches securely with adhesive foam. This way the customizable vehicle side mirror trim will not obstruct the side mirror's movements.

1 Claim, 4 Drawing Sheets

CUSTOMIZABLE VEHICLE SIDE MIRROR TRIM

CROSS-REFERENCE TO RELATED APPLICATION

The present application is related to and claims priority from prior provisional application Ser. No. 62/383,314, filed Apr. 25, 2019, the entire application of which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of covering devices, often referred to as trim, for vehicle side mirrors and more specifically relates to a customizable vehicle side mirror trim for automobiles.

2. Description of the Related Art

A side view mirror is a mirror found on the exterior of motor vehicles for the purposes of helping the driver see areas behind and to the sides of the vehicle, outside the driver's peripheral vision in the driver's blind spot. The side mirror is equipped for manual or remote vertical and horizontal adjustment so as to be adjustable by drivers of differing height and seated position in order to ensure the driver's blind spot is visible in the side mirror. The mirror glass may also be electrically heated to prevent fogging, and may include electrochromic dimming to reduce glare to the driver from the headlamps of following vehicles. Increasingly, the side mirror also incorporates the vehicle's turn signal repeaters, as there is evidence to suggest mirror-mounted repeaters may be more effective than repeaters mounted in the previously predominant fender side location.

Aftermarket customizing of vehicles is a common practice in many countries, making it possible for the owner of the vehicle to add personality or improve the aesthetics of their vehicle without the cost of custom manufacturing. Customizable vehicle side mirror trim can quickly add personality to an otherwise bland car, but too many currently available designs cover the entire mirror housing, leading to a garish look rather than an aesthetically pleasing accent.

Various attempts have been made to solve the problems that may be found in the related art but have thus far been unsuccessful. A need exists for a reliable customizable vehicle side mirror trim to avoid the above-mentioned problems.

BRIEF SUMMARY OF THE INVENTION

In view of the foregoing disadvantages inherent in the known art, the present invention provides a novel customizable vehicle side mirror trim. The general purpose of the presently claimed invention, as will be described subsequently in greater detail, is to provide a customizable vehicle side mirror trim that accents the side mirrors of an automobile without covering the entire mirror housing The a customizable vehicle side mirror trim as provides a subtle yet distinctive trim accent to create a clean, custom appearance for any vehicle make or model. The customizable vehicle side mirror trim can be quickly installed to add a flash of color or a touch of polished texture to the user's side mirrors, for a strong, stylish look that will set the vehicle apart.

The customizable vehicle side mirror trim easily clips onto the edge of the mirror housing and attaches securely with adhesive foam. This way the customizable vehicle side mirror trim will not obstruct the side mirror's movements.

The features of the invention that are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures that accompany the written portion of this specification illustrate embodiments and method(s) of use for the present invention, Customizable Side Mirror Trim, constructed and operative according to the teachings of the present invention.

The various embodiments of the present invention will hereinafter be described in conjunction with the appended drawings.

DETAILED DESCRIPTION

As discussed above, embodiments of the present invention relate to a customizable trim for vehicle side mirrors, and more particularly to an aftermarket self-installable vehicle side mirror trim for customizing a vehicle.

Figure 1:
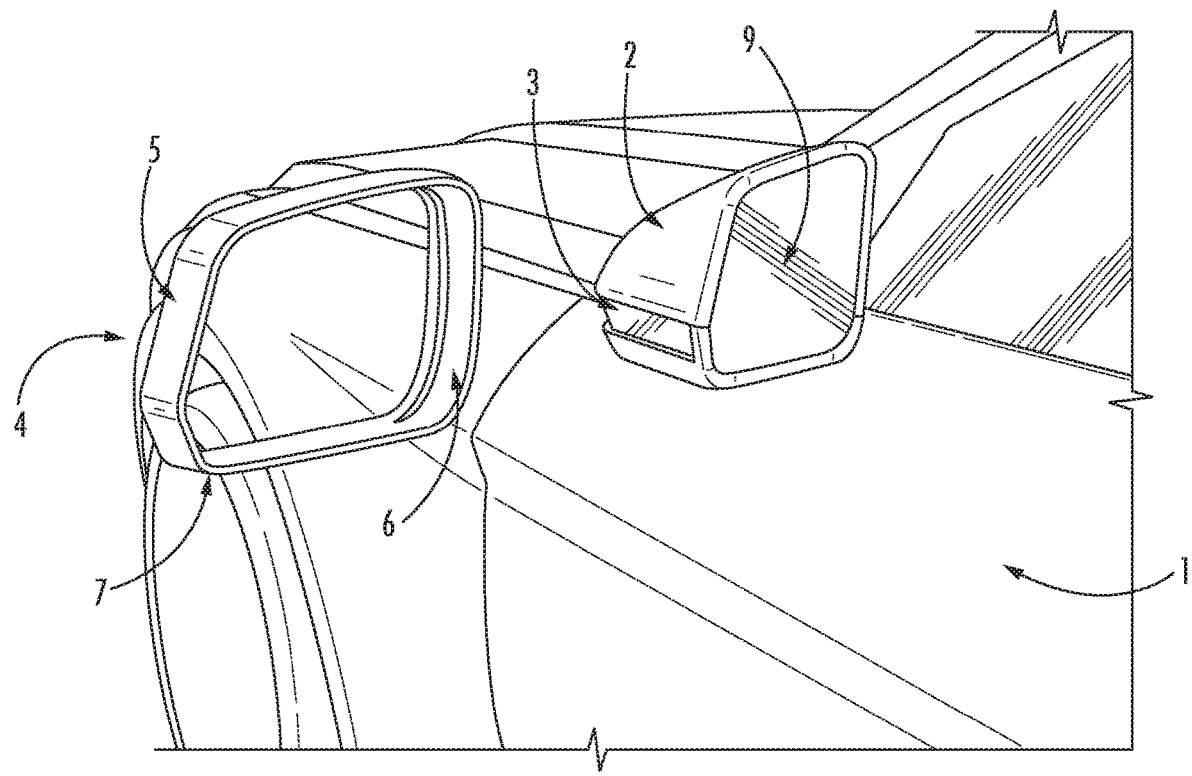
FIG. 1 shows a perspective view illustrating a vehicle side mirror and customizable vehicle side mirror trim prior to installation, according to an embodiment of the present invention.

Referring now to the drawings, FIG. 1 shows a vehicle 1 with a side mirror housing 2 that optionally has a turn signal light 3 on the housing. The customizable vehicle side mirror trim 4 has an outer trim piece 5 and an inner trim piece 6 that connect along the front edge 7 to form a seamless piece.

Figure 2:
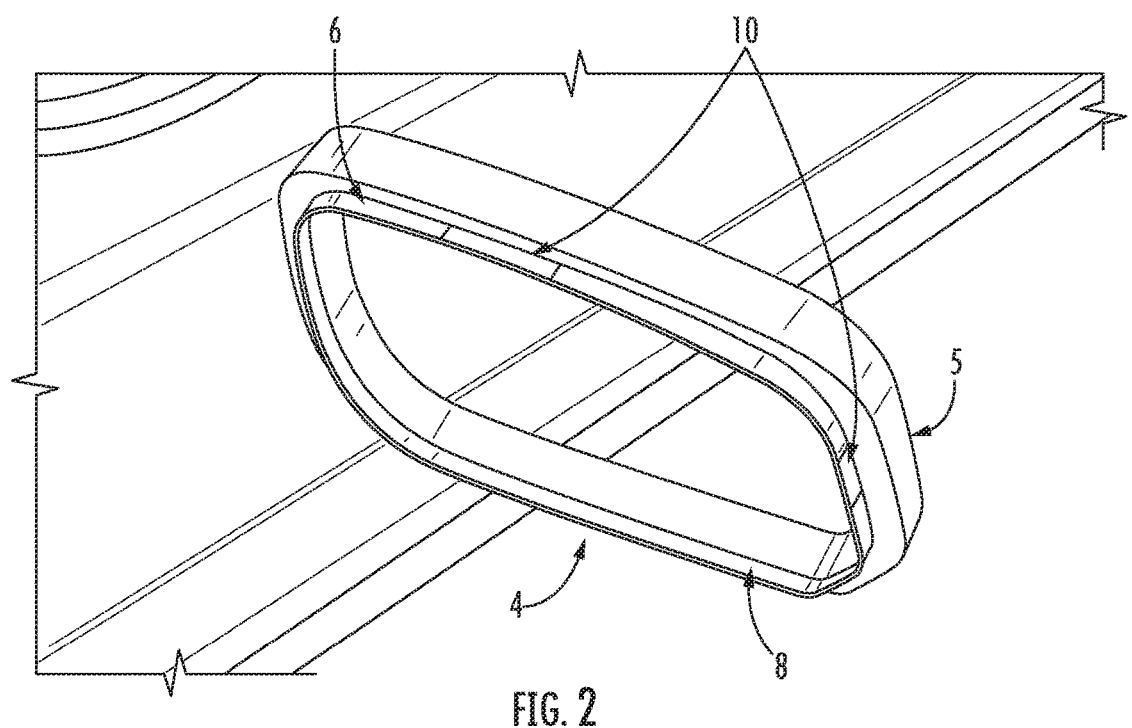
FIG. 2 is a perspective view illustrating a customizable vehicle side mirror trim from the back, according to an embodiment of the present invention.

As shown in FIG. 2, the inner part 6 of the trim 4 has a lip 8 that helps to hold the trim 4 into place between the side mirror 9 and the side mirror housing 2. The inner part 6 of the trim 4 also has one or more adhesive foam pieces 10 adhered thereon. The inner part 6 of the trim 4 preferably has at least one adhesive foam piece 10 per side. The inner part of the trim 6 with the lip 8 slides between the mirror 9 and the side mirror housing 2, and is held in place by the lip 8 and the adhesive foam pieces 10.

Figure 7:
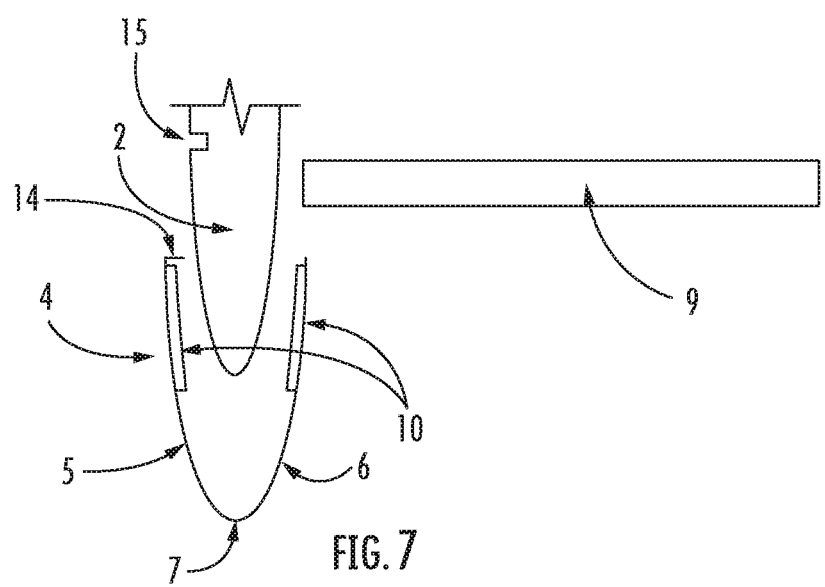
FIG. 7 is a perspective view illustrating part of a vehicle side mirror and a customizable vehicle side mirror clip-on trim, according to an embodiment of the present invention.

Alternately, as shown in FIG. 7, the trim 4 has a clip-on part 14 on the outside that clips into a slot 15 on the mirror housing 2 that some vehicles have. The trim 4 with the clip-on part 14 also has at least one adhesive foam piece 10 per side, and preferably has an adhesive foam piece 10 on both the inside of the inner trim piece 6 and on the inside of the outer trim piece 5, so that the trim 4 slides over the housing 2 until the clip-on part 14 clips into the groove 15 on the outside of the mirror housing 2, if a groove is present, and adheres to the mirror housing via the adhesive foam pieces 10, ensuring that the trim 4 is held in place on the housing 2.

Figure 3:
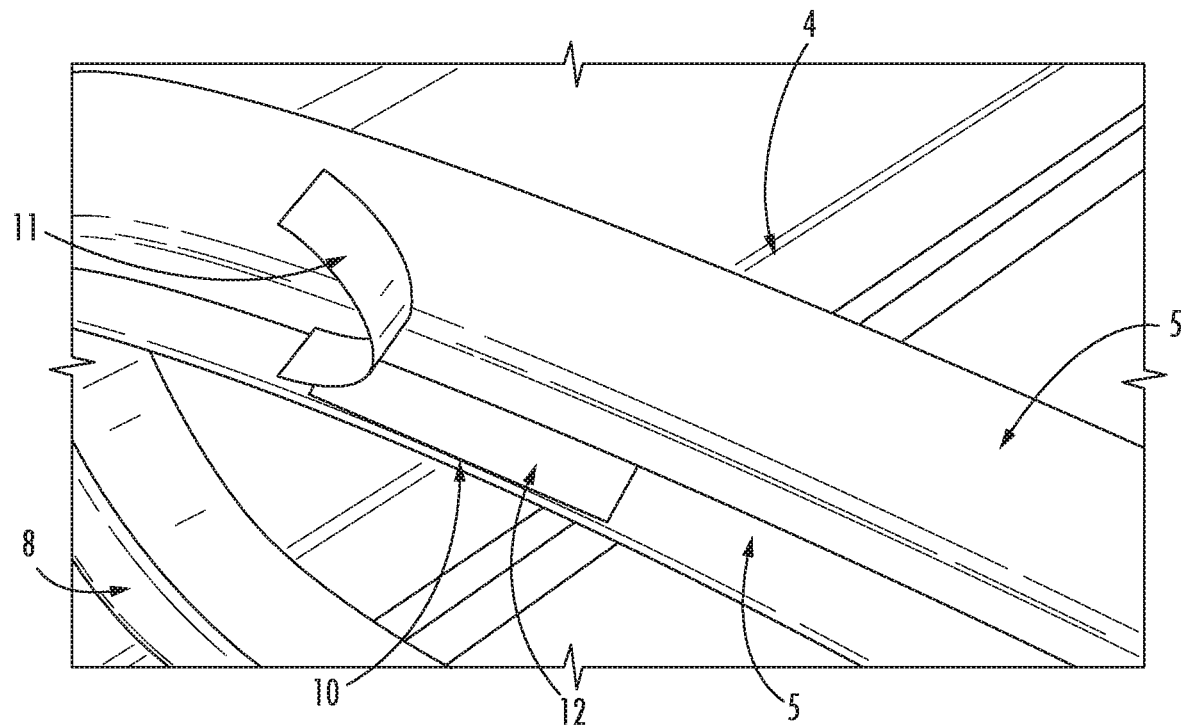
FIG. 3 is a perspective view illustrating the adhesive tables of customizable vehicle side mirror trim, according to an embodiment of the present invention.

As shown in FIG. 3, the adhesive foam pieces 10 are adhered to the inner part 6 of the trim 4 so that the adhesive foam pieces 10 are located between the side mirror 9 and the side mirror housing 2, so that the adhesive foam pieces 10 adhere the inner trim 6 to the side mirror housing 2. The adhesive foam pieces 10 have a removeable covering 11 to protect the adhesive surface 12 prior to installing the trim 4 on to the side mirror housing 2. The removeable covering 11 is peeled off by the user, exposing the adhesive surface 12 before sliding or snapping the trim 4 into place.

Figure 4:
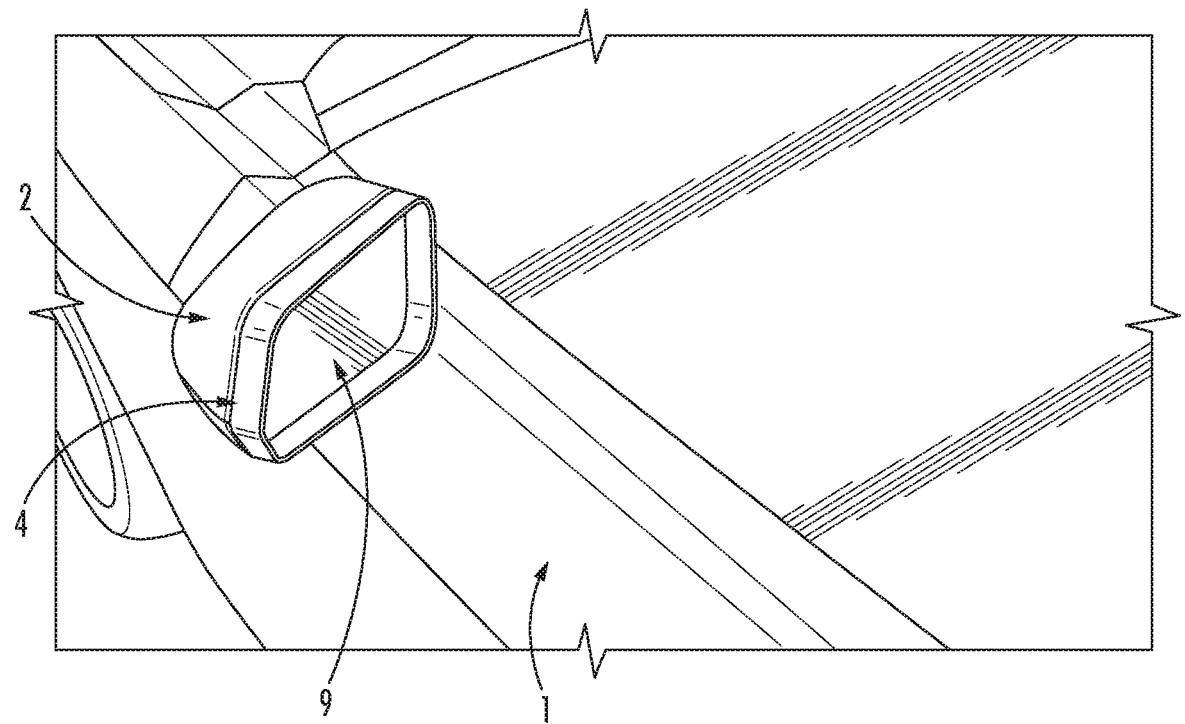
FIG. 4 is a perspective view illustrating a vehicle side mirror and a customizable vehicle side mirror trim installed thereon, according to an embodiment of the present invention.

As shown in FIG. 4, after installation, the trim 4 abuts snuggly against the side mirror housing 2, leaving the mirror 9 completely visible. The trim 4 completely surrounds the mirror 9, but by adhering to the inside of the mirror housing 2, the trim will not interfere with the moveability of the mirror 9.

Figure 5:
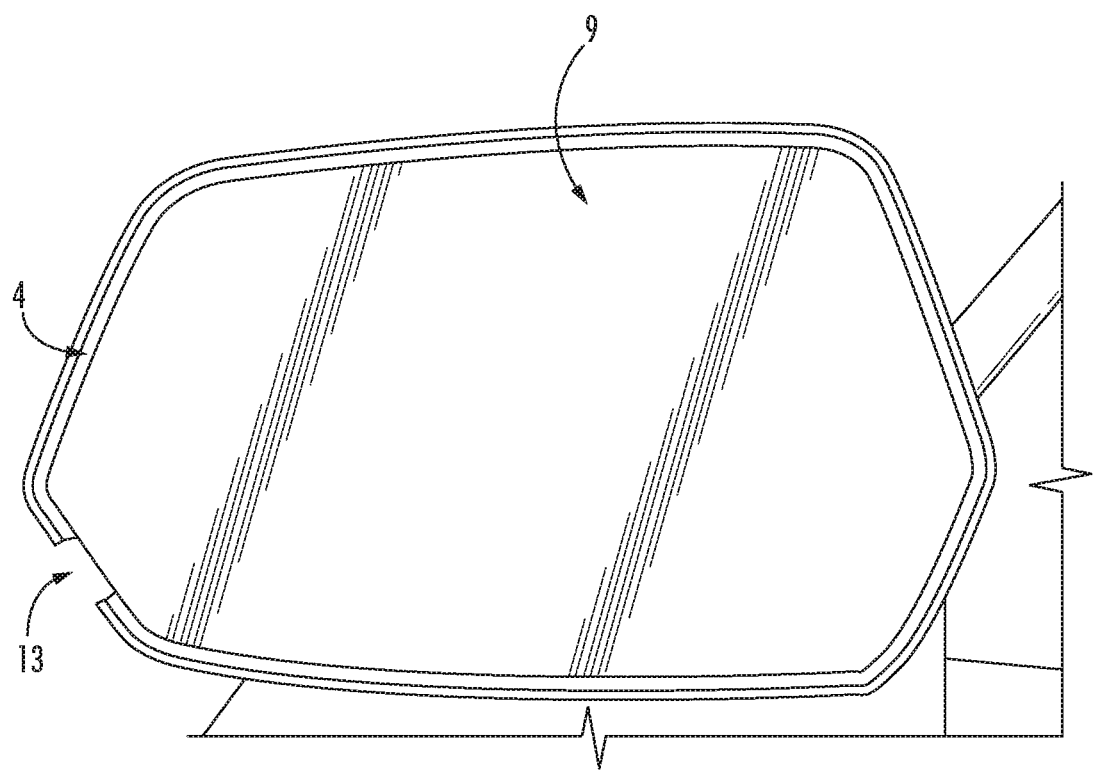
FIG. 5 is a perspective view illustrating a vehicle side mirror a customizable vehicle side mirror trim with a gap for a turn signal installed thereon, according to an embodiment of the present invention.
Figure 6:
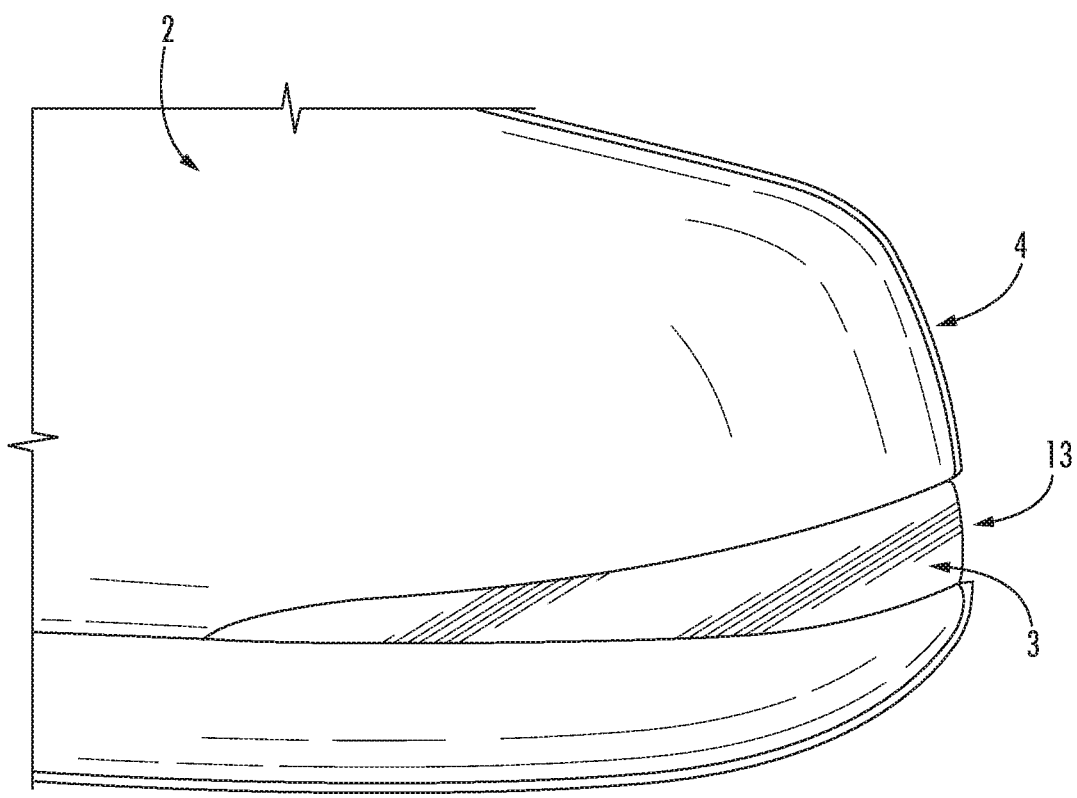
FIG. 6 is a perspective view illustrating a vehicle side mirror and a customizable vehicle side mirror trim with a gap for a turn signal installed thereon, according to an embodiment of the present invention.

As shown in FIGS. 5-6, the trim 4 may optionally include a gap 13 in the outer section 5 of the trim 4, so that the outer part 5 does not block a driver in a car behind the vehicle 1 from seeing the turn signal 3. The inner section 6 of the trim 4 in tact, to maintain a firm structure and the aesthetic appeal of the inner section 6 of the trim 4 surrounding the mirror 9.

The trim 4 can be matched to other trim pieces on the vehicle, and can be formed in any shape so that it is customizable for any make and model of vehicle, which often have slightly different mirror shapes. The trim 4 is preferably manufactured from a durable plastic material, but may be manufactured out of any material suitable for vehicle trims, such as fiberglass and metal. The trim 4 may be manufactured in a variety of colors and metallic finishes, including chrome, carbon filter, matte black, off white, blue, red, yellow, camo, and a paintable surface so the user can paint the trim a color of choice.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claim:

1. A customizable vehicle side mirror trim device comprising:
   an inner surface;
   an outer surface;
   a lip;
   an adhesive foam piece;
   a removeable covering;
   a gap;
   the inner surface and the outer surface being oppositely located to each other;
   the lip being configured to fit in between a side mirror and a side mirror housing;
   the lip comprising an inner side and an outer side;
   the inner side and the outer side being oppositely located to each other;
   the outer side of the lip being connected to the inner surface;
   the adhesive foam piece being adhered to the outer side of the lip;
   the removeable covering removeably covering the adhesive foam piece;
   in response to the removeable covering being peeled off from the adhesive foam piece, the adhesive foam piece being adhereable to the side mirror housing;
   the gap traversing through the inner surface and the outer surface; and
   the gap being configured to reveal a turn signal light indicator on the side mirror housing.

\* \* \* \* \*